United States Patent
Guan et al.

(10) Patent No.: US 10,693,629 B2
(45) Date of Patent: Jun. 23, 2020

(54) SYSTEM AND METHOD FOR BLOCKCHAIN ADDRESS MAPPING

(71) Applicant: ALIBABA GROUP HOLDING LIMITED, Grand Cayman (KY)

(72) Inventors: Yayang Guan, Hangzhou (CN); Yuan Chen, Hangzhou (CN); Kai Wang, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/739,008

(22) Filed: Jan. 9, 2020

(65) Prior Publication Data

US 2020/0145198 A1     May 7, 2020

Related U.S. Application Data

(63) Continuation of application No. PCT/CN2019/093675, filed on Jun. 28, 2019.

(51) Int. Cl.
*H04L 29/06* (2006.01)
*H04L 9/06* (2006.01)
*H04L 9/30* (2006.01)

(52) U.S. Cl.
CPC .............. *H04L 9/0637* (2013.01); *H04L 9/30* (2013.01); *H04L 2209/127* (2013.01); *H04L 2209/38* (2013.01)

(58) Field of Classification Search
CPC ..... H04L 9/0637; H04L 9/30; H04L 2209/38; H04L 2209/127
See application file for complete search history.

(56) References Cited

U.S. PATENT DOCUMENTS

| | | | |
|---|---|---|---|
| 9,569,771 B2 | 2/2017 | Lesavich et al. | |
| 10,097,356 B2 | 10/2018 | Zinder | |
| 10,269,009 B1 | 4/2019 | Winklevoss et al. | |
| 2015/0270956 A1* | 9/2015 | Basmov | G06F 21/602 |
| | | | 713/189 |
| 2016/0248809 A1* | 8/2016 | Smith | H04L 63/0435 |
| 2016/0283941 A1 | 9/2016 | Andrade | |

(Continued)

FOREIGN PATENT DOCUMENTS

| CN | 106372941 A | 2/2017 |
|---|---|---|
| CN | 108494605 A | 9/2018 |

(Continued)

OTHER PUBLICATIONS

Written Opinion of the International Searching Authority and International Search Report for PCT Application No. PCT/CN2019/093635 dated Mar. 26, 2020.

(Continued)

*Primary Examiner* — John B King
(74) *Attorney, Agent, or Firm* — Sheppard Mullin Richter & Hampton LLP

(57) ABSTRACT

Methods, systems, and apparatus, including computer programs encoded on computer storage media, for blockchain address mapping are provided. One of the methods includes: obtaining one or more requests for creating a plurality of blockchain addresses in association with one or more local accounts; and creating the plurality of blockchain addresses respectively in association with the one or more local accounts.

18 Claims, 7 Drawing Sheets

(56) References Cited

U.S. PATENT DOCUMENTS

| | | | |
|---|---|---|---|
| 2017/0005804 A1* | 1/2017 | Zinder | H04L 9/3247 |
| 2017/0046664 A1 | 2/2017 | Haldenby et al. | |
| 2017/0048209 A1 | 2/2017 | Lohe et al. | |
| 2017/0048235 A1 | 2/2017 | Lohe et al. | |
| 2017/0236123 A1 | 8/2017 | Ali et al. | |
| 2018/0054491 A1 | 2/2018 | Mankovskii et al. | |
| 2018/0089758 A1 | 3/2018 | Stradling et al. | |
| 2018/0137512 A1 | 5/2018 | Georgiadis et al. | |
| 2018/0240107 A1 | 8/2018 | Andrade | |
| 2018/0247191 A1 | 8/2018 | Katz et al. | |
| 2018/0253703 A1 | 9/2018 | Smith et al. | |
| 2018/0264347 A1 | 9/2018 | Tran et al. | |
| 2018/0276626 A1 | 9/2018 | Laiben | |
| 2018/0343120 A1 | 11/2018 | Andrade | |
| 2019/0139314 A1* | 5/2019 | Marsh | G06T 19/20 |
| 2019/0245688 A1* | 8/2019 | Patin | H04L 9/0869 |
| 2019/0340393 A1* | 11/2019 | Mo | G06F 21/57 |
| 2019/0362352 A1 | 11/2019 | Kumawat et al. | |
| 2019/0386833 A1* | 12/2019 | Alger | G06F 7/24 |

FOREIGN PATENT DOCUMENTS

| | | | |
|---|---|---|---|
| CN | 109003030 A | 12/2018 | |
| CN | 109040341 A | 12/2018 | |
| CN | 109359976 A | 2/2019 | |
| CN | 109857751 A | 6/2019 | |
| CN | 109859047 A | 6/2019 | |

OTHER PUBLICATIONS

Preinterview first office action for U.S. Appl. No. 16/738,920 dated Mar. 26, 2020.

* cited by examiner

SYSTEM AND METHOD FOR BLOCKCHAIN ADDRESS MAPPING

CROSS REFERENCE TO RELATED APPLICATION

The present application is a continuation application of International Patent Application No. PCT/CN2019/093675, filed on Jun. 28, 2019, and entitled "SYSTEM AND METHOD FOR BLOCKCHAIN ADDRESS MAPPING", the entire contents of which are incorporated herein by reference.

TECHNICAL FIELD

This application generally relates to methods and devices for blockchain address mapping.

BACKGROUND

Blockchain provides data storage in a decentralized fashion by keeping the data in a series of data blocks having precedence relationship between each other. The chain of blocks is maintained and updated by a network of blockchain nodes, which are also responsible for validating data under a consensus scheme. The stored data may include many data types, such as financial transactions among parties, historical access information, etc.

Many blockchains (e.g., the Ethereum blockchain) have enabled blockchain contracts (also referred to as smart contracts) that are executed through blockchain transactions. Blockchain transactions are signed messages originated by externally owned accounts (e.g., blockchain accounts), transmitted by the blockchain network, and recorded in the blockchain. The blockchain contracts may be written to achieve various functions, such as adding data to blockchain accounts, changing data in the blockchain, etc. Thus, the blockchain can be maintained and updated by executing various blockchain transactions.

In existing blockchain schemes, each blockchain node needs to execute the various blockchain transactions to maintain the blockchain. After a consensus is reached, all blockchain nodes need to execute the same transactions in an agreed order to keep local copies of the blockchain synchronized. Because each execution requires significant computing power, a lot of computing resources are consumed in repetitive computations. As the complexity of the blockchain transaction algorithm scales up, the redundancy issue will be even more significant. Further, as most blockchain transactions are constructed for individual needs and do not account for other contemporaneously executed blockchain transactions, the execution efficiency for these blockchain transactions is low.

For example, to create blockchain accounts, a client locally creates or retrieves each local account and creates a public/private key pair for the local account. Then, the client packs the public key and a corresponding target blockchain ID in a blockchain transaction in a blockchain transaction for blockchain account creation. As a result, only one blockchain account is created each time per local account per blockchain. Moreover, the client has to store and manage the created blockchain address, public-private keys, and blockchain ID for the each local account, which puts burden on the client for maintaining storage and security. Further, because the blockchain transaction is independently written by the client in a closed environment, a slight mistake may cause execution errors for the entire blockchain transaction and potentially incur a great financial loss. Without continuous resource investment, security protocols maintained by the client may become obsolete or outdated or harbor loopholes, which may lead to security breaches to the blockchain system.

SUMMARY

Various embodiments of the specification include, but are not limited to, systems, methods, and non-transitory computer readable media for blockchain address mapping.

According to some embodiments, a computer-implemented method for blockchain address mapping comprises: obtaining one or more requests for creating a plurality of blockchain addresses in association with one or more local accounts; and creating the plurality of blockchain addresses respectively in association with the one or more local accounts.

In some embodiments, obtaining the one or more requests for creating the plurality of blockchain addresses in association with the one or more local accounts comprises: obtaining the one or more requests for creating the plurality of blockchain addresses in a plurality of blockchains in association with one local account; and creating the plurality of blockchain addresses respectively in association with the one or more local accounts comprises: correspondingly in the plurality of blockchains, creating in a batch the plurality of blockchain addresses in association with the one local account.

In some embodiments, obtaining the one or more requests for creating the plurality of blockchain addresses in association with the one or more local accounts comprises: obtaining the one or more requests for creating the plurality of blockchain addresses in one blockchain in association with a plurality of local accounts; and creating the plurality of blockchain addresses respectively in association with the one or more local accounts comprises: in the one blockchain, creating in a batch the plurality of blockchain addresses in association with the plurality of the local accounts.

In some embodiments, obtaining the one or more requests for creating the plurality of blockchain addresses in association with the one or more local accounts comprises: obtaining the one or more requests for creating the plurality of blockchain addresses in a plurality of blockchains in association with a plurality of local accounts; and creating the plurality of blockchain addresses respectively in association with the one or more local accounts comprises: correspondingly in the plurality of blockchains, creating in a batch the plurality of blockchain addresses in association with the plurality of the local accounts.

In some embodiments, obtaining the one or more requests for creating the plurality of blockchain addresses in association with the one or more local accounts comprises: obtaining, from a client, the one or more local accounts, one or more identifications of one or more blockchains, and the one or more requests for creating the plurality of blockchain addresses in the one or more blockchains.

In some embodiments, creating the plurality of blockchain addresses respectively in association with the one or more local accounts comprises: generating a plurality of public-private key pairs respectively for the plurality of blockchain addresses to be created; and creating the plurality of blockchain addresses respectively in the one or more blockchains, in association with the one or more local accounts and a plurality of public keys of the plurality of public-private key pairs.

In some embodiments, the method further comprises storing a plurality of mapping relationships among the one or more local accounts, the plurality of created blockchain addresses, the plurality of public-private key pairs, and the one or more identifications of the one or more blockchains.

In some embodiments, creating the plurality of blockchain addresses respectively in association with the one or more local accounts comprises: constructing a blockchain transaction comprising the plurality of public keys; and sending the blockchain transaction to one or more blockchain nodes of the one or more blockchains according to the one or more identifications to create the plurality of blockchain addresses respectively based on the plurality of public keys.

In some embodiments, the method further comprises transmitting a notification to the client for the client to correspondingly store the one or more local accounts in association with the one or more identifications of the one or more blockchains. The notification comprises the one or more local accounts for which the plurality of blockchain addresses are created and the one or more corresponding identifications of the one or more blockchains; and the client does not store the one or more created blockchain addresses.

In some embodiments, creating the plurality of blockchain addresses respectively in association with the one or more local accounts comprises: for each of the plurality of blockchain addresses, generating a public-private key pair and encrypting a private key of the public-private key pair.

In some embodiments, generating the public-private key pair and encrypting the private key of the public-private key pair comprises: in a Trusted Execution Environment (TEE), generating the public-private key pair and encrypting the private key of the public-private key pair.

In some embodiments, creating the plurality of blockchain addresses respectively in association with the one or more local accounts further comprises: for each of the plurality of blockchain addresses, storing the encrypted private key in a Key Management System (KMS).

In some embodiments, the method further comprises: for each of the plurality of blockchain addresses, storing a mapping relationship among one of the local accounts, the each of the blockchain addresses, a corresponding KMS directory, and one of the identifications, wherein the KMS directory links to the corresponding encrypted private key.

In some embodiments, obtaining the one or more requests for creating the plurality of blockchain addresses in association with the one or more local accounts comprises: obtaining, from a client, the one or more local accounts in accordance with a Lightweight Directory Access Protocol (LDAP).

According to some embodiments, a system for blockchain address mapping comprises one or more processors and one or more computer-readable memories coupled to the one or more processors and having instructions stored thereon that are executable by the one or more processors to perform the method of any of the preceding embodiments.

According to some embodiments, an apparatus for blockchain address mapping comprises a plurality of modules for performing the method of any of the preceding embodiments.

According to some embodiments, a non-transitory computer-readable medium has stored therein instructions that, when executed by a processor of a device, cause the device to perform the method of any of the preceding embodiments.

According to other embodiments, a system for blockchain address mapping comprises one or more processors and one or more non-transitory computer-readable memories coupled to the one or more processors and configured with instructions executable by the one or more processors to cause the system to perform operations comprising: obtaining one or more requests for creating a plurality of blockchain addresses in association with one or more local accounts; and creating the plurality of blockchain addresses respectively in association with the one or more local accounts.

According to yet other embodiments, a non-transitory computer-readable storage medium for blockchain address mapping is configured with instructions executable by one or more processors to cause the one or more processors to perform operations comprising: obtaining one or more requests for creating a plurality of blockchain addresses in association with one or more local accounts; and creating the plurality of blockchain addresses respectively in association with the one or more local accounts.

According to still other embodiments, an apparatus for blockchain address mapping may comprise: an obtaining module for obtaining one or more requests for creating a plurality of blockchain addresses in association with one or more local accounts; and a creating module for creating the plurality of blockchain addresses respectively in association with the one or more local accounts.

Embodiments disclosed in the specification have one or more technical effects. By centralizing blockchain account creations, the disclosed embodiments can conserve network computing power, reduce storage and security burdens for clients (e.g., client systems or devices), and improve blockchain operation efficiency. In some embodiments, a server end may offer Blockchain-as-a-Service (BaaS) or a similar type of service to various clients, client requests regarding blockchain account creation and the like can be channeled to the server end. These requests can be processed in a batch with respect to one or more different blockchains. Many similar requests may be compiled and executed in one blockchain transaction or fewer blockchain transactions to reduce the repetitive executions on virtual machines for individually fulfilling the requests by executing individual blockchain transactions. Thus, the overall network computing power is conserved. Moreover, batch processing is enabled for multiple blockchain account creations in multiple blockchains for multiple users. Thus, blockchain account creation efficiency is improved. Further, common algorithms such as encryption/decryption, data analysis, task flow, and state storage can be effectively managed by the server end and efficiently invoked for each batch of blockchain contract execution. Thus, maintenance and execution of redundant algorithms are reduced. As the server end oversees the operation scheme and ensures system security, the storage and security burden on the clients is reduced or eliminated. Thus, with the disclosed systems and methods, the efficiency, stability, and security of the blockchain are significantly enhanced. Further, existing users of clients are allowed to interact with the blockchains simply by connecting to the server end 118. Thus, the usability of blockchains is expanded without burdening the client. As a result, clients can access blockchain in a safer, quicker, simpler, and more efficient manner.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Figure 1:
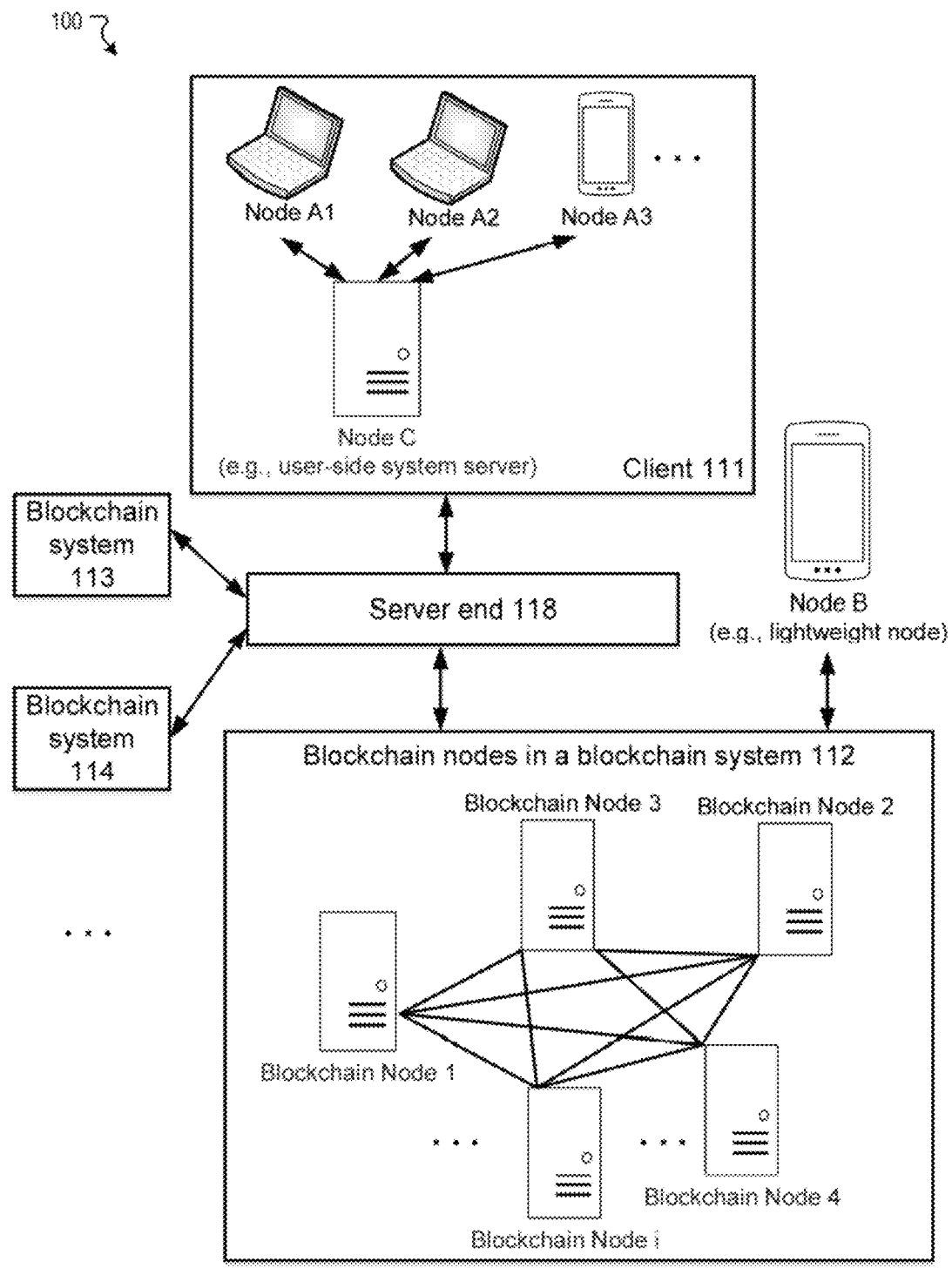
FIG. 1 illustrates an environment for blockchain address mapping in accordance with some embodiments.

FIG. 1 shows an environment 100 for blockchain address mapping in accordance with some embodiments. As shown, in the environment 100, a client 111 may couple to a server end 118, and the server end 118 and a Node B may couple to a blockchain system 112 through various communication networks. Similarly, the server end 118 may optionally couple to more blockchain systems similar to the blockchain system 112 such as blockchain system 113, blockchain system 114, etc. Each blockchain system may maintain one or more blockchains. Each blockchain may correspond to a unique blockchain ID.

In some embodiments, the client 111 may comprise one or more servers (e.g., Node C) and one or more other computing devices (e.g., Node A1, Node A2, Node A3). Node A1, Node A2, and Node A3 may couple to Node C. In some embodiments, Node C may be implemented by an entity (e.g., website, mobile phone Application, organization, company, enterprise), which has various local accounts (e.g., local accounts assessed from Node A1, Node A2, Node A3). For example, a mobile phone Application may have millions of end-users accessing the Application's server from respective user accounts. The Application's server may correspondingly store millions of user accounts. The components of the client 111 and their arrangement may have many other configurations.

In some embodiments, Node B may include a lightweight node. A lightweight node may not download the complete blockchain, but may instead just download the block headers to validate the authenticity of the blockchain transactions. Lightweight nodes may be served by and effectively dependent on full nodes (e.g., blockchain nodes in the blockchain system 112) to access more functions of the blockchain. The lightweight nodes may be implemented in electronic devices such as laptops, mobile phones, and the like by installing an appropriate software.

In some embodiments, there may be many more clients coupled to the server end 118 similar to client 111. The server end 118 may provide Blockchain-as-a-Service (BaaS) and be referred to as a BaaS end. In one embodiment, BaaS is a cloud service model in which clients or developers outsource behind-the-scenes aspects of a web or mobile application. BaaS may provide pre-written software for activities that take place on blockchains, such as user authentication, database management, and remote updating. The BaaS end may be implemented in a server, server cluster, or other devices. In one embodiment, the BaaS end provides an enterprise-level platform service based on blockchain technologies. This service helps clients to build a secure and stable blockchain environment as well as manage the deployment, operation, maintenance, and development of blockchain easily. The service features high security, high stability, ease-of-use, and openness and sharing. Based on the abundant security strategies and multi-tenant isolation of cloud, the BaaS end can provide advanced security protection using chip encryption technologies. Based on highly reliable data storage, this service provides end-to-end and highly available services that can scale up quickly without interruption. The BaaS end can provide enhanced administrative functions to help clients to build an enterprise-level blockchain network environment. The BaaS end can provide native support for standard blockchain applications and data, support mainstream open-source blockchain technologies like Hyperledger Fabric and Enterprise Ethereum-Quorum, to build an open and inclusive technology ecosystem.

In some embodiments, the blockchain system 112 may comprise a plurality of blockchain nodes (e.g., Blockchain Node 1, Blockchain Node 2, Blockchain Node 3, Blockchain Node 4, Blockchain Node i, etc.) that maintain one or more blockchains (e.g., public blockchain, private blockchain, etc.). Other blockchain systems (e.g., blockchain system 113, blockchain system 114) may comprise similar arrangements of blockchain nodes maintaining other blockchains. Each blockchain node may be found in one or more blockchain systems. The blockchain nodes of each blockchain system may maintain one or more blockchains. The blockchain nodes may include full nodes. Full nodes may download every block and blockchain transaction and check them against the blockchain's consensus rules. The blockchain nodes may form a network (e.g., peer-to-peer network) with one blockchain node communicating with another. The order and the number of the blockchain nodes as shown are merely examples for illustration. The blockchain nodes may be implemented in servers, computers, etc. For example, each blockchain node may be implemented in a server or a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

In the environment 100, each of the nodes and devices may be installed with appropriate software (e.g., application program interface) and/or hardware (e.g., wires, wireless connections) to access other devices of the environment 100. In general, the nodes and devices may be able to communicate with one another through one or more wired or wireless networks (e.g., the Internet) through which data can be communicated. Each of the nodes and devices may include one or more processors and one or more memories coupled to the one or more processors. The memories may be non-transitory and computer-readable and configured with instructions executable by one or more processors to cause the one or more processors to perform operations described herein. The instructions may be stored in the memories or downloaded over a communications network without necessarily being stored in the memories. Although the nodes and devices are shown as separate components in this figure, it will be appreciated that these nodes and devices can be implemented as single devices or multiple devices coupled together. For example, Node B may be alternatively integrated into Blockchain Node 2.

The devices such as Node A1, Node A2, Node A3, Node B, and Node C may be installed with an appropriate blockchain software to create blockchain accounts, and initiate, forward, or access blockchain transactions. The term "blockchain transaction" may refer to a unit of task executed in a blockchain system and recorded in the blockchain. For example, Node A1 may access the blockchain through communications with Node C, the server end 118, and Blockchain Node 1, and Node B may access the blockchain through communications with Blockchain Node 2. In some embodiments, Node A1 may submit a blockchain account creation request to Node C. Node C may forward the request and other similar requests to the server end 118. The server end 118 may accordingly create blockchain accounts. To this end, the server end 118 may compile the account creations requests, generate instructions (e.g., in the form of a blockchain transaction), and transmit them to one or more blockchain nodes (e.g., Blockchain Node 1) for execution. If the blockchain transaction includes a blockchain contract, the blockchain nodes may execute blockchain transaction to deploy the blockchain contract or invoke a deployed blockchain contract.

In some embodiments, after receiving a blockchain transaction request of an unconfirmed blockchain transaction, a recipient blockchain node may perform some preliminary verification of the blockchain transaction. For example, Blockchain Node 1 may perform the preliminary verification after receiving a blockchain transaction from Node C. Once verified, the blockchain transaction may be stored in the pool database of the recipient blockchain node (e.g., Blockchain Node 1), which may also forward the blockchain transaction to one or more other blockchain nodes (e.g., Blockchain Node 3, Blockchain Node 4). As each blockchain node may comprise or couple to a memory, the pool database may be respectively stored in the memories of the blockchain nodes. The pool database may store a plurality of blockchain transactions submitted by the one or more client devices. After receiving the blockchain transaction, the one or more other blockchain nodes may repeat the process done by the recipient blockchain node.

Each blockchain node may select some of the blockchain transactions from the pool according to its preference and form them into a proposed new block for the blockchain. The blockchain node may perform "mining" of the proposed new block by devoting computing power to solve complex mathematical problems. If the blockchain transaction involves a blockchain contract, the blockchain nodes may execute the blockchain contract locally in respective virtual machines (VMs). To handle the blockchain contracts, each blockchain node of the blockchain network runs a corresponding VM and executes the same instructions in the blockchain contract. A VM is a software emulation of a computer system based on computer architectures and provide functionality of a physical computer. VM in the blockchain context can be understood us a system designed to operate as a runtime environment for blockchain contracts.

A certain blockchain node that successfully mines the proposed new block of blockchain transactions in accordance with consensus rules may pack the new block into its local copy of the blockchain and multicast the results to other blockchain nodes. The certain blockchain node may be a blockchain node that has first successfully completed the verification, that has obtained a verification privilege, or that has been chosen based on another consensus rule, etc. Then, the other blockchain nodes may follow the same order of execution performed by the certain blockchain node to locally execute the blockchain transactions in the new block, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories. As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, Node C or Node B may request to invoke the deployed blockchain contract to perform various operations. For example, data stored in the deployed blockchain contract may be retrieved. For another example, data may be added to the deployed blockchain contract. For yet another example, a financial transaction specified in the deployed blockchain contract may be executed. Notwithstanding the above, other types of blockchain systems and associated consensus rules may be applied to the disclosed blockchain system.

Figure 2:
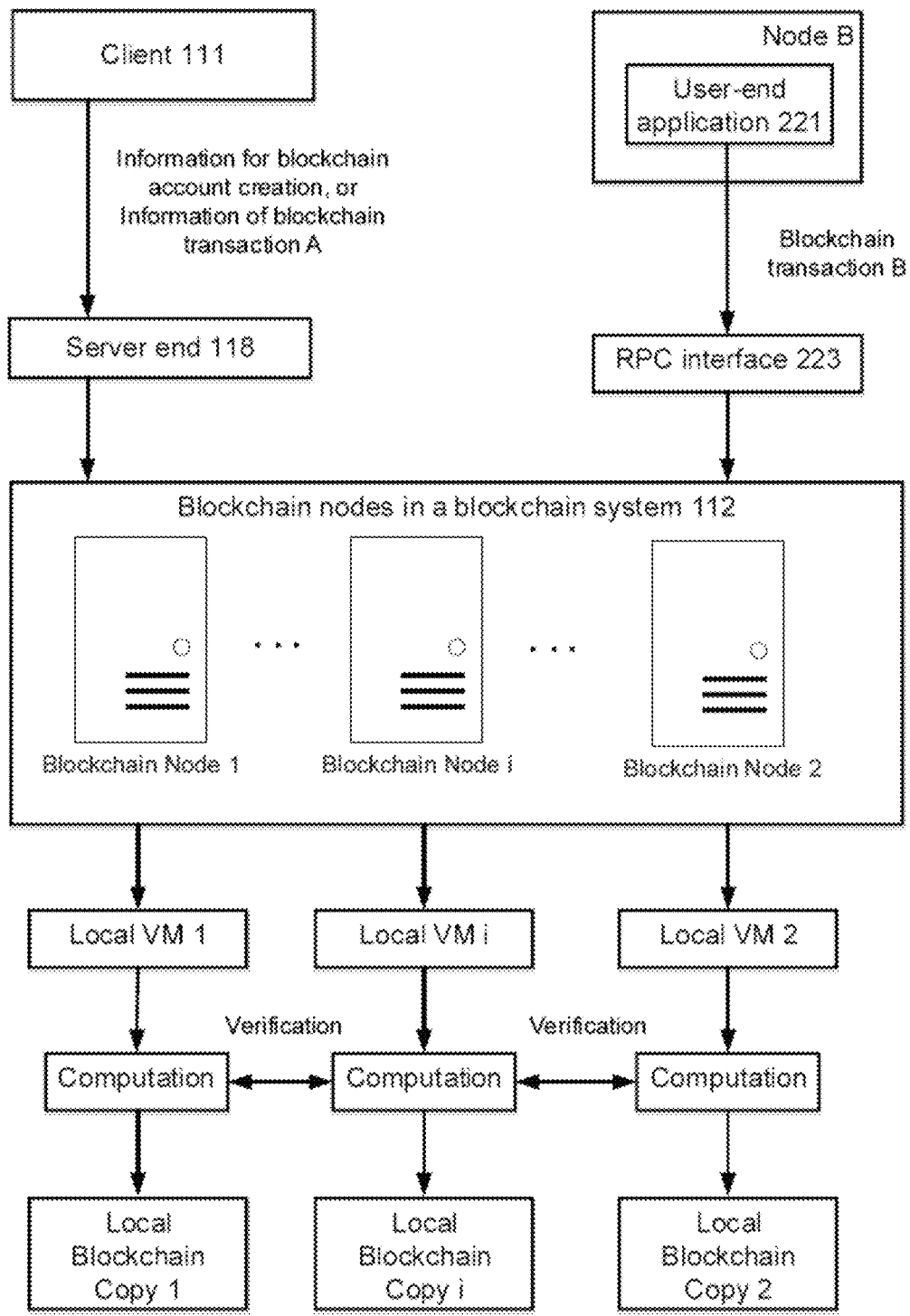
FIG. 2 illustrates a framework for implementing blockchain transactions in accordance with some embodiments.

FIG. 2 illustrates a framework for implementing blockchain transactions in accordance with some embodiments. In some embodiments, the client 111 may transmit information (e.g., a request with relevant information for creating a blockchain account) to the server end 118 for the server end 118 to create a blockchain account. To this end, the server end 118 may generate cryptography keys, compile the request with other account creation requests, and/or perform other operations. Then, the server end 118 may transmit a blockchain transaction (e.g., blockchain transaction A) including the compiled account creation requests to one or more of blockchain nodes for execution.

In some embodiments, Node B may construct a signed blockchain transaction and transmit it to one or more blockchain nodes for execution. In one embodiment, Node B may construct a blockchain transaction B. The blockchain transaction B may comprise a blockchain contract B for deployment or invoking a deployed blockchain contract. For example, the blockchain transaction B may comprise a blockchain contract that creates a blockchain account or invokes a deployed blockchain contract A. The blockchain contract B may be programmed in source code at a user-end application 221. For example, a user or machine may program the blockchain contract B. Node B may compile the source code using a corresponding compiler, which converts the source code into bytecode. The blockchain transaction B may comprise information such as nonce (e.g., transaction serial number), from (e.g., a blockchain address of Node B or another blockchain address), to (e.g., empty if deploying a blockchain contract), transaction fee, value (e.g., transaction amount), signature (e.g., signature of Node B), data (e.g., message to a contract account), etc. The Node B may send the blockchain transaction B to one or more blockchain nodes through a remote procedure call (RPC) interface 223 for execution. RPC is a protocol that a first program (e.g., user-end application) can use to request a service from a second program located in another computer on a network (e.g., blockchain node) without having to understand the network's details. When the first program causes a procedure to execute in a different address space, it is as if a normal (local) procedure call, without the programmer explicitly coding the details for the remote interaction.

In some embodiments, on receiving the blockchain transaction (e.g., blockchain transaction A or B), the recipient blockchain may verify if the blockchain transaction is valid. For example, the signature and other formats may be verified. If the verification succeeds, the recipient blockchain node may broadcast the received blockchain transaction (e.g., blockchain transaction A or B) to the blockchain network including various other blockchain nodes. Some blockchain nodes may participate in the mining process of the blockchain transactions. The blockchain transaction may be picked by a certain node for consensus verification to pack into a new block. If the blockchain transaction involves a blockchain contract, the certain node may create a contract account for a blockchain contract in association with a contract account address. If the blockchain transaction involves invoking a deployed blockchain contract, the certain node may trigger its local VM to execute the received blockchain transaction, thereby invoking the deployed blockchain contract from its local copy of the blockchain and updating the account states in the blockchain. If the certain node succeeds in mining a new block, the certain node may broadcast the new block to other blockchain nodes. The other blockchain nodes may verify the new block as mined by the certain blockchain node. If consensus is reached, the blockchain transaction B is respectively packed to the local copies of the blockchain maintained by the blockchain nodes. The blockchain nodes may similarly trigger their local VMs to execute the blockchain transaction B, thus invoking the blockchain contract A deployed on the local copies of the blockchain and making corresponding updates.

Upon receiving the new block, the other blockchain nodes may perform verifications. If a consensus is reached that the new block is valid, the new block is respectively packed to the local copies of the blockchain maintained by the blockchain nodes. The blockchain nodes may similarly trigger their local VMs (e.g., local VM 1, local VM local VM 2) to execute the blockchain transactions in the new block, thus invoking local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain transaction. Likewise, all other blockchain transactions in the new block will be executed. Lightweight nodes may also synchronize to the updated blockchain.

Figure 3:
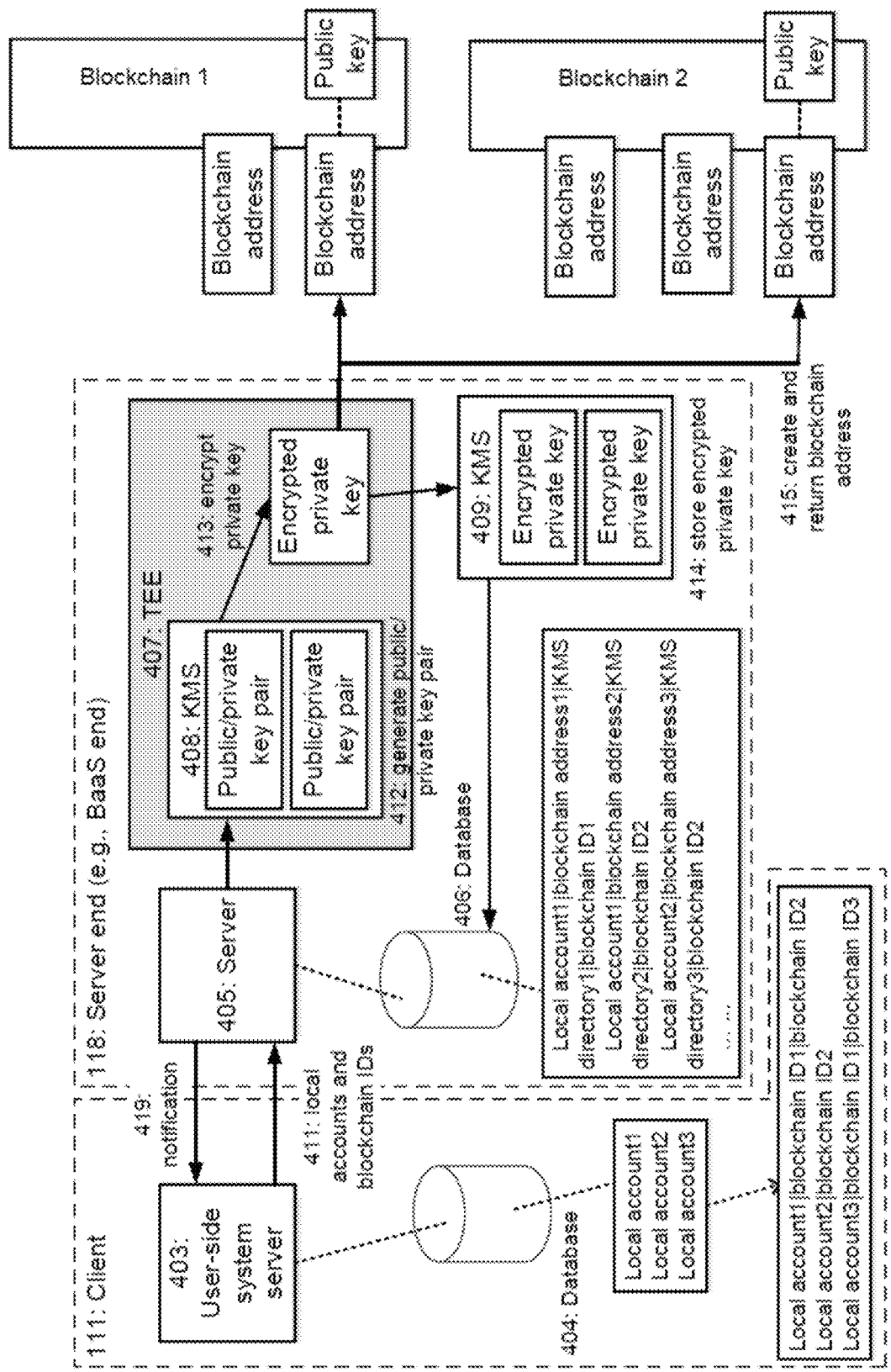
FIG. 3 illustrates a flowchart for blockchain address mapping in accordance with some embodiments.

FIG. 3 illustrate a flowchart for blockchain address mapping in accordance with some embodiments. Various steps presented in FIG. 3 may be referred to as a method for blockchain address mapping. The operations of the method presented below are intended to be illustrative. Depending on the implementation, the method may include additional, fewer, or alternative steps performed in various orders or in parallel.

As shown, a client 111 interacts with a server end 118 for blockchain address mapping. The client 111 may include one or more servers or similar computing devices of an entity such as a website, mobile phone Application, company, organization, etc. The client 111 may store and maintain one or more local accounts such as user accounts registered at the website or user accounts of company employees. The server end 118 may include one or more servers or similar computing devices. The server end 118 may provide Blockchain-as-a-Service (BaaS) to one or more clients including the client 111. For example, the server end 118 may create blockchain addresses (blockchain accounts) for the local accounts in the client 111. The server end 118 may couple to the one or more clients and one or more blockchain nodes of one or more blockchains. For simplicity, the one or more blockchain nodes are represented by the corresponding blockchain. For example, blockchain 1 may represent the blockchain itself and its blockchain nodes, and blockchain 2 may represent the blockchain itself and its blockchain nodes.

In some embodiments, the client 111 may include a user-side system server 403, which maintains a database 404. The database 404 may store a plurality of local accounts (e.g., local accounts 1, 2, 3). For example, the database 404 may store millions of user accounts of a website, mobile phone Application, company, organization, etc. To create blockchain addresses (blockchain accounts) on corresponding blockchains for the local accounts, user-side system server 403 may transmit information of local accounts and blockchain IDs of the blockchains to a server 405 of server end 118 (step 411). For example, the user of local account 1 wants to open a blockchain account on blockchain 1 having a blockchain ID 1 and another blockchain account on blockchain 2 having a blockchain ID 2; the user of local account 2 wants to open a blockchain account on blockchain 2; and the user of local account 3 wants to open a blockchain account on blockchain 1 and another blockchain account on blockchain 3 having a blockchain ID 3. These local accounts and their corresponding blockchains for creating blockchain accounts are sent to the server end 118 in blockchain account creation requests.

In some embodiments, the server 405 may obtain one or more requests for creating a plurality of blockchain addresses (respectively representing a plurality of blockchain accounts) in association with one or more local accounts. In some embodiments, the server 405 may obtain, from a client (e.g., the user-side system server 403 of the client 111), the one or more local accounts (e.g., in the form of local account IDs, email addresses, phone numbers, etc.), one or more identifications of one or more blockchains, and the one or more requests for creating the plurality of blockchain addresses in the one or more blockchains. The information of the local accounts and/or identifications may be included in one request or be dispersed in multiple requests.

In some embodiments, the server end 118 may obtain, from a client (e.g., the user-side system server 403 of the client 111), the one or more local accounts in accordance with a Lightweight Directory Access Protocol (LDAP). LDAP is an open and vendor-neutral industry standard application protocol for accessing and maintaining distributed directory information services over a network. As an example, directory services may provide an organized set of records including the local accounts, with a hierarchical structure, such as a corporate email directory. LDAP may allow the client 111 to receive the blockchain account mapping service from the server end 118 with little change to existing databases or other infrastructures. That is, the client does not have to develop complicated interfaces with interact with the blockchains. Instead, the client can allow its existing users to interact with the blockchains simply by connecting to the server end 118. Thus, the usability of blockchains is expanded without burdening the client.

In some embodiments, the server end 118 may generate a plurality of public-private key pairs respectively for the plurality of blockchain addresses to be created and may create the plurality of blockchain addresses respectively in the one or more blockchains, in association with the one or more local accounts and a plurality of public keys of the plurality of public-private key pairs. For example, for each local account, one or more blockchain accounts may be correspondingly created in one or more blockchains. For example, if local account 1 requests to open blockchain addresses (representing blockchain accounts) in blockchain 1 and blockchain 2, and local account 2 requests to open a blockchain address in blockchain 2, then a public-private key pair 1 may be generated for creating local account 1's blockchain address in blockchain 1, a public-private key pair 2 may be generated for creating local account 1's blockchain address in blockchain 2, and a public-private key pair 3 may be generated for creating local account 2's blockchain address in blockchain 2.

The server end 118 may perform the key generation in a secured environment. In some embodiments, the server 405 may pass the obtained information to a trusted execution environment (TEE) 407 to generate a plurality of cryptography keys (e.g., public-private key pairs) respectively for the plurality of blockchain addresses. The cryptography key generation may be performed in the TEE. The TEE may be a part of the server 405 or disposed outside of the server 405. In general terms, the TEE offers an execution space that provides a higher level of security. In one embodiment, a TEE is a secure area of a main processor. It may guarantee code and data loaded inside to be protected with respect to confidentiality and integrity. A TEE as an isolated execution environment provides security features such as isolated execution, integrity of applications executing with the TEE, along with confidentiality of their assets.

In some embodiments, for each of the plurality of blockchain addresses, the server 405 may generate a public-private key pair (step 412) and encrypt a private key of the public-private key pair (step 413). In one embodiment, the server 405 may, in a Trusted Execution Environment (TEE), generate the public-private key pair and encrypting the private key of the public-private key pair. For example, as shown, a Key Management System (KMS) 408 may generate the public/private key pair in the TEE 407. The TEE may be a part of the server 405 or disposed outside of the server 405. The KMS, also known as a cryptographic key management system (CKMS), is an integrated approach for generating, distributing, and managing cryptographic keys for devices and applications. They may cover security aspects from secure generation of keys over the secure exchange of keys up to secure key handling and storage. Thus, a KMS includes the backend functionality for key generation, distribution, and replacement as well as the client functionality for injecting keys, storing and managing keys on devices. To enhance security, the generated private key can be in plaintext inside TEE but is kept encrypted outside TEE. The encryption of the private key can be based on various methods or standards, such as Data Encryption Standard (DES), TripleDES, RSA, Advanced Encryption Standard (AES), Twofish, etc. In some embodiments, for each of the plurality of blockchain addresses, the server 405 may store the encrypted private key in a Key Management System (KMS) (step 414).

In some embodiments, the server end 118 may create the plurality of blockchain addresses respectively in association with the one or more local accounts. The blockchain addresses may be created to represent blockchain accounts and are associated with public keys. The public keys are made public to the blockchain network. For example, for each blockchain address creation request by a local account, the server end 118 may create the blockchain address based on the generated public key of the cryptography key pair, and the blockchain address is associated with the local account.

In addition to individually creating blockchain addresses on one or more blockchains, the server end 118 may create blockchain addresses in a batch. In some embodiments, the server end 118 may create in a batch multiple blockchain addresses on multiple blockchains for one local account. For example, the server end 118 may obtain the one or more requests for creating the plurality of blockchain addresses in a plurality of blockchains in association with one local account. Further, correspondingly in the plurality of blockchains, the server end 118 may create in a batch the plurality of blockchain addresses in association with the one local account.

In some embodiments, the server end 118 may create in a batch multiple blockchain addresses on one blockchain for multiple local accounts. For example, the server end 118 may obtain the one or more requests for creating the plurality of blockchain addresses in one blockchain in association with a plurality of local accounts. Further, in the one blockchain, the server end 118 may create in a batch the plurality of blockchain addresses in association with the plurality of the local accounts.

In some embodiments, the server end 118 may create in a batch multiple blockchain addresses on multiple blockchains for multiple local accounts. For example, the server end 118 may obtain the one or more requests for creating the plurality of blockchain addresses in a plurality of blockchains in association with a plurality of local accounts. Further, correspondingly in the plurality of blockchains, the server end 118 may create in a batch the plurality of blockchain addresses in association with the plurality of the local accounts. For example, for each local account, one or more blockchain accounts may be correspondingly created in one or more blockchains.

In some embodiments, the server end 118 may construct a blockchain transaction comprising the plurality of public keys, and send the blockchain transaction to one or more blockchain nodes of the one or more blockchains according to the one or more identifications to create the plurality of blockchain addresses respectively based on the plurality of public keys. Thus, various blockchain account creation requests are compiled into one blockchain transaction for efficient execution. For example, if local account 1 requests to open blockchain addresses (representing blockchain accounts) in blockchain 1 and blockchain 2, and local account 2 requests to open a blockchain address in blockchain 2, then the server end 118 may construct a blockchain transaction comprising a public key 1 of the public-private key pair 1, a public key 2 of the public-private key pair 2, and a public key 3 of the public-private key pair 3 to one or more blockchain nodes to create the plurality of blockchain addresses respectively based on the plurality of public keys. For example, SHA3 or another encryption method may be used to generate a blockchain address from a public key.

Further, if the one or more blockchain nodes maintain both blockchain 1 and blockchain 2, then the server end 118 may put the public key 1, public key 2, and public key 3 in one blockchain transaction, as long as indicating that the public key 1 is for creating a blockchain address on blockchain 1, and the public key 2 and the public key 3 are for respectively creating two blockchain addresses on blockchain 2. The indication may be achieved by associating the public key with an ID of the corresponding blockchain. The one or more blockchain nodes may or may not be all of the blockchain nodes of any blockchain. If, however, blockchain 1 and blockchain 2 are maintained by different blockchain nodes, then the server end 118 may construct two blockchain transactions, of which one blockchain transaction includes the public key 1 and the other blockchain transaction includes public key 2 and public key 3. Then, the server end 118 may send the two blockchain transactions to the blockchain nodes of respective blockchains 1 and 2 for execution.

In some embodiments, to construct the blockchain transaction(s), the server end 118 may maintain and apply common algorithms such as encryption/decryption, data analysis, task flow, and state storage to a plurality of blockchain account creation requests. Thus, overall network computing power is conserved, since repetitive executions of the blockchain transactions on different blockchain nodes are obviated.

In some embodiments, for each of the plurality of blockchain addresses, the server end 118 may store a mapping relationship among one of the local accounts, the each of the blockchain addresses created in association with the one local account, a corresponding KMS directory, and one of the identifications, wherein the KMS directory links to the corresponding encrypted private key. In some embodiments, the server end 118 may store a plurality of mapping relationships among the one or more local accounts, the plurality of created blockchain addresses, the plurality of public-private key pairs, and the one or more identifications of the one or more blockchains. For example, each blockchain address may represent a blockchain account in a blockchain, and may be stored in a database (e.g., database 406) with its corresponding local account, public-private key pair, and an identification of the blockchain. For example, as shown, in a first entry, local account 1 is stored in association with blockchain address 1, KMS directory 1, and blockchain ID 1 of blockchain 1; in a second entry, local account 1 is stored in association with blockchain address 2, KMS directory 2, and blockchain ID 2 of blockchain 2; in a third entry, local account 2 is stored in association with blockchain address 3, KMS directory 3, and blockchain ID 2 of blockchain 2; etc. Accordingly, by querying any local account in the database 406, the server end 118 can find its corresponding blockchain account(s) in one or more blockchains and corresponding KMS director(ies). The director(ies) will lead to the encrypted private key(s) stored in the KMS, which can be decrypted in TEE.

In some embodiments, the server end 118 may transmit a notification to the client 111 for the client to correspondingly store the one or more local accounts in association with the one or more identifications of the one or more blockchains (step 419). The notification may comprise the one or more local accounts for which the plurality of blockchain addresses are created and the one or more corresponding identifications of the one or more blockchains. The client may not store the one or more created blockchain addresses. For example, the client may not store the created blockchain addresses and the KMS directory. That is, the client may not store the corresponding public-private keys for the created blockchain addresses. As shown, by the notification, the client 111 is informed of the successful creation of the blockchain accounts and can thus update the database 404. For example, local account 1 is updated to associate with blockchain 1 (blockchain ID 1) and blockchain 2 (blockchain ID 2), local account 2 is updated to associate with blockchain 2, and local account 3 is updated to associate with blockchain 1 and blockchain 3 (blockchain ID 3). As the client 111 does not have to store the blockchain addresses and public/private keys, the storage and security burden on the client is alleviated.

As such, the server end 118 may oversee the operations for blockchain account creation and ensure system security. As a result, the storage and security burden on the client is at least reduced. Since the server end 118 may provide services to many clients, the server end 118 may maintain and update common algorithms for all requests. Thus, with the disclosed systems and methods, the efficiency, stability, and security are significantly improved for creating blockchain accounts. Accordingly, clients can open blockchain accounts in a safer, quicker, simpler, and more efficient manner.

Figure 4:
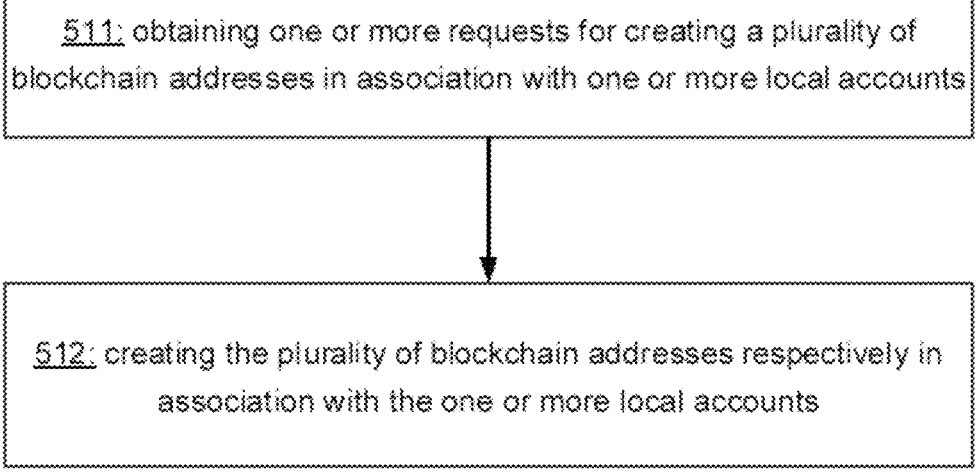
FIG. 4 and FIG. 5 illustrate a flowchart of a method for blockchain address mapping in accordance with some embodiments.
Figure 5:
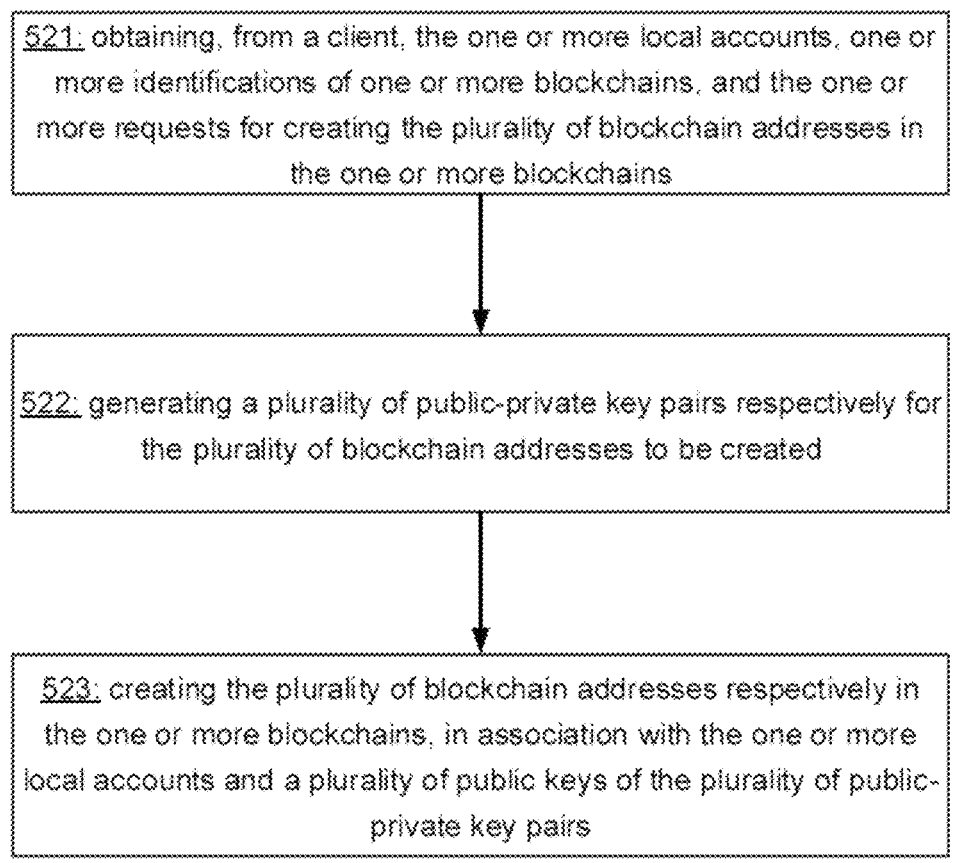

FIG. 4 and FIG. 5 illustrate a flowchart of an exemplary method 510 for blockchain address mapping, according to some embodiments of this specification. The method 510 may be performed by a device, apparatus, or system for blockchain address mapping (e.g., the server end 118). The method 510 may be performed by one or more components of the environment 100 of FIG. 1 (e.g., the server end 118). The server end 118 may implement Blockchain-as-a-Service (BaaS). The server end 118 may include one or more servers or other computing devices. The method 510 may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 510. The operations of method 510 presented below are intended to be illustrative. Depending on the implementation, the method 510 may include additional, fewer, or alternative steps performed in various orders or in parallel. Further details of the method 510 can be referred to FIG. 1 to FIG. 3 and related descriptions above. For example, the steps for blockchain address mapping described with reference to FIG. 3 are included in the method 510.

Block 511 includes obtaining one or more requests for creating a plurality of blockchain addresses in association with one or more local accounts. Each blockchain address may uniquely identify a blockchain account. In one example, one request for creating the plurality of blockchain addresses in association with the one or more local accounts may be obtained. In another example, multiple requests collectively for creating the plurality of blockchain addresses in association with the one or more local accounts may be obtained.

In some embodiments, block 511 includes block 521. Obtaining the one or more requests for creating the plurality of blockchain addresses in association with the one or more local accounts comprises: obtaining, from a client, the one or more local accounts, one or more identifications of one or more blockchains, and the one or more requests for creating the plurality of blockchain addresses in the one or more blockchains. In one embodiment, the client may comprise one or more servers or similar computing devices of an entity such as a website, mobile phone Application, company, organization, etc. The client may store and maintain the one or more local accounts such as user accounts registered at the website or user accounts of company employees.

In some embodiments, obtaining the one or more requests for creating the plurality of blockchain addresses in association with the one or more local accounts comprises: obtaining, from a client, the one or more local accounts in accordance with a Lightweight Directory Access Protocol (LDAP).

Block 512 includes creating the plurality of blockchain addresses respectively in association with the one or more local accounts.

In some embodiments, the server end 118 may create in a batch multiple blockchain addresses on multiple blockchains for one local account. For example, obtaining the one or more requests for creating the plurality of blockchain addresses in association with the one or more local accounts comprises: obtaining the one or more requests for creating the plurality of blockchain addresses in a plurality of blockchains in association with one local account; and creating the plurality of blockchain addresses respectively in association with the one or more local accounts comprises: correspondingly in the plurality of blockchains, creating in a batch the plurality of blockchain addresses in association with the one local account.

In some embodiments, the server end 118 may create in a batch multiple blockchain addresses on one blockchain for multiple local accounts. For example, obtaining the one or more requests for creating the plurality of blockchain addresses in association with the one or more local accounts comprises: obtaining the one or more requests for creating the plurality of blockchain addresses in one blockchain in association with a plurality of local accounts; and creating the plurality of blockchain addresses respectively in association with the one or more local accounts comprises: in the one blockchain, creating in a batch the plurality of blockchain addresses in association with the plurality of the local accounts.

In some embodiments, the server end 118 may create in a batch multiple blockchain addresses on multiple blockchains for multiple local accounts. For example, obtaining the one or more requests for creating the plurality of blockchain addresses in association with the one or more local accounts comprises: obtaining the one or more requests for creating the plurality of blockchain addresses in a plurality of blockchains in association with a plurality of local accounts; and creating the plurality of blockchain addresses respectively in association with the one or more local accounts comprises: correspondingly in the plurality of blockchains, creating in a batch the plurality of blockchain addresses in association with the plurality of the local accounts. For example, for each local account, one or more blockchain accounts may be correspondingly created in one or more blockchains.

In some embodiments, block 512 includes block 522 and 523. Creating the plurality of blockchain addresses respectively in association with the one or more local accounts comprises: generating a plurality of public-private key pairs respectively for the plurality of blockchain addresses to be created; and creating the plurality of blockchain addresses respectively in the one or more blockchains, in association with the one or more local accounts and a plurality of public keys of the plurality of public-private key pairs. For example, for each local account, one or more blockchain accounts may be correspondingly created in one or more blockchains.

In some embodiments, creating the plurality of blockchain addresses respectively in association with the one or more local accounts comprises: constructing a blockchain transaction comprising the plurality of public keys; and sending the blockchain transaction to one or more blockchain nodes of the one or more blockchains according to the one or more identifications to create the plurality of blockchain addresses respectively based on the plurality of public keys.

In some embodiments, creating the plurality of blockchain addresses respectively in association with the one or more local accounts comprises: for each of the plurality of blockchain addresses, generating a public-private key pair and encrypting a private key of the public-private key pair. In one embodiment, generating the public-private key pair and encrypting the private key of the public-private key pair comprises: in a Trusted Execution Environment (TEE), generating the public-private key pair and encrypting the private key of the public-private key pair. In one embodiment, creating the plurality of blockchain addresses respectively in association with the one or more local accounts further comprises: for each of the plurality of blockchain addresses, storing the encrypted private key in a Key Management System (KMS).

In some embodiments, the method further comprises: for each of the plurality of blockchain addresses, storing a mapping relationship among one of the local accounts, the each of the blockchain addresses, a corresponding KMS directory, and one of the identifications, wherein the KMS directory links to the corresponding encrypted private key. In some embodiments, the method further comprises storing a plurality of mapping relationships among the one or more local accounts, the plurality of created blockchain addresses, the plurality of public-private key pairs, and the one or more identifications of the one or more blockchains. For example, each blockchain address may represent a blockchain account in a blockchain, and may be stored in a database with its corresponding local account, public-private key pair, and an identification of the blockchain.

In some embodiments, the method further comprises transmitting a notification to the client for the client to correspondingly store the one or more local accounts in association with the one or more identifications of the one or more blockchains. The notification comprises the one or more local accounts for which the plurality of blockchain addresses are created and the one or more corresponding identifications of the one or more blockchains; and the client does not store the one or more created blockchain addresses. For example, the client may not store the created blockchain addresses and the KMS directory. That is, the client may not store the corresponding private keys for the created blockchain addresses.

Figure 6:
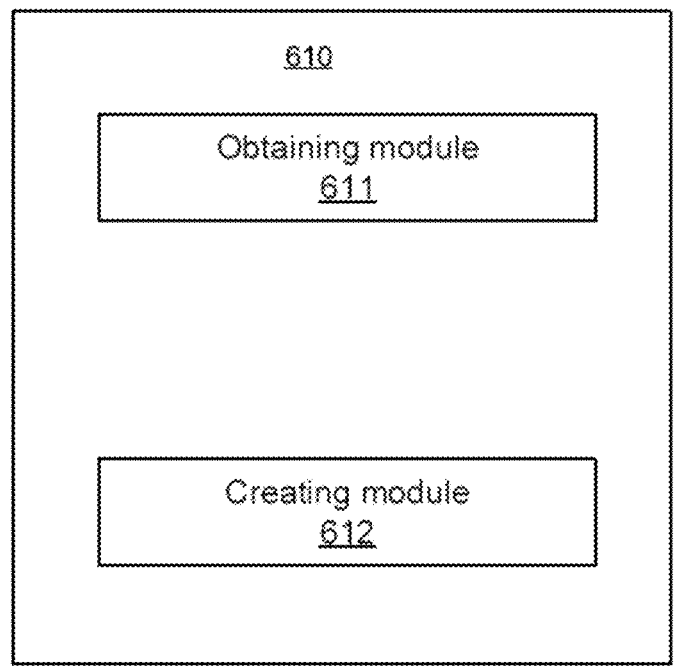
FIG. 6 illustrates a block diagram of an apparatus blockchain address mapping in accordance with some embodiments.

FIG. 6 illustrates a block diagram of a system 610 for blockchain address mapping in accordance with some embodiments. The system 610 (e.g., a computer system) may be an example of an implementation of the server end 118 described above, a similar device or system of devices, or a combination of the server end 118 and one or more additional devices. For example, the method 510 may be implemented by the system 610. The system 610 may comprise one or more processors and one or more non-transitory computer-readable storage media (e.g., one or more memories) coupled to the one or more processors and configured with instructions executable by the one or more processors to cause the system or device (e.g., the processor) to perform the methods and operations described above, e.g., the method 510. The system 610 may comprise various units/modules corresponding to the instructions (e.g., software instructions).

In some embodiments, the system 610 may be referred to as an apparatus for blockchain address mapping. The apparatus may include: an obtaining module 611 for obtaining one or more requests for creating a plurality of blockchain addresses in association with one or more local accounts and a creating module 612 for creating the plurality of blockchain addresses respectively in association with the one or more local accounts.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 7:
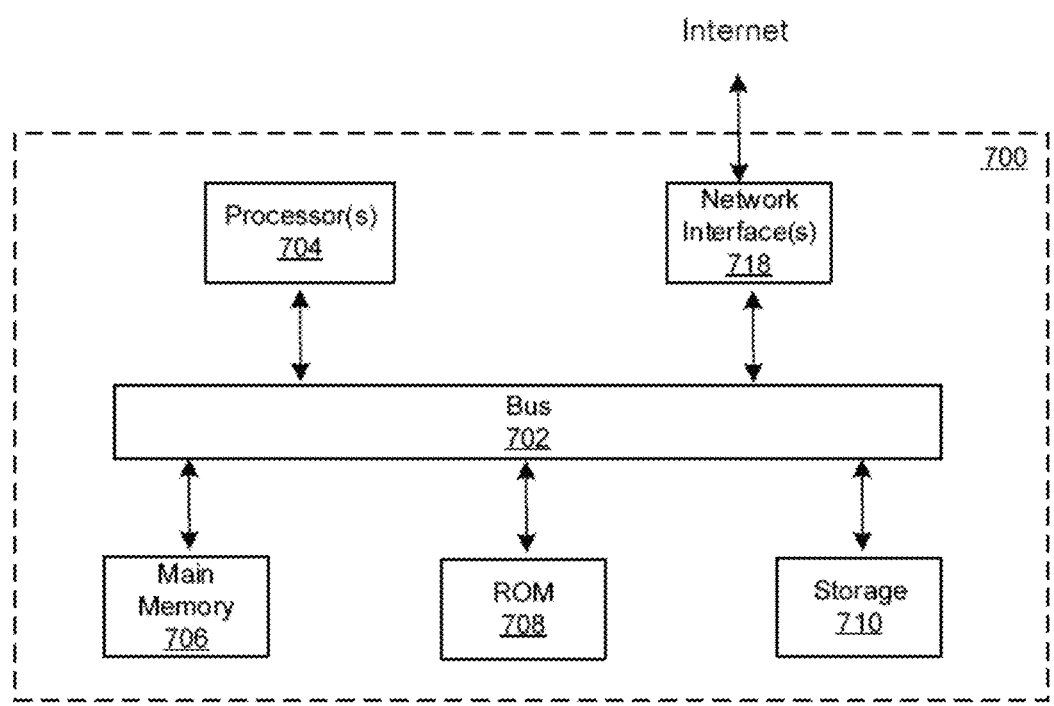
FIG. 7 illustrates a block diagram of a computer system in which any of the embodiments described herein may be implemented.

FIG. 7 is a block diagram that illustrates a computer system 700 upon which any of the embodiments described herein may be implemented. The system 700 may perform any of the methods described herein (e.g., the method 510 and related steps). The system 700 may be implemented in any of the systems described herein (e.g., the system 610, the server end 118). The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate.

For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented method for blockchain address mapping, to be performed by a system for blockchain address mapping, comprising:
   obtaining, from a client, one or more local accounts, one or more identifications of one or more blockchains, and one or more requests for creating in the one or more blockchains a plurality of blockchain addresses in association with the one or more local accounts, wherein the client corresponds to the one or more local accounts in the system;
   generating a plurality of public-private key pairs respectively for the plurality of blockchain addresses to be created;
   creating the plurality of blockchain addresses respectively in the one or more blockchains, in association with the one or more local accounts and a plurality of public keys of the plurality of public-private key pairs; and
   transmitting a notification to the client for the client to correspondingly store the one or more local accounts in association with the one or more identifications of the one or more blockchains, wherein:
      the notification comprises the one or more local accounts for which the plurality of blockchain addresses are created and the one or more corresponding identifications of the one or more blockchains, and
      the plurality of blockchain addresses and a plurality of private keys of the plurality of public-private key pairs are stored in the system and are not stored at the client.

2. The method of claim 1, wherein:
   obtaining the one or more local accounts, the one or more identifications of the one or more blockchains, and the one or more requests comprises: obtaining the one or more requests for creating the plurality of blockchain addresses in a plurality of blockchains in association with one local account; and
   creating the plurality of blockchain addresses respectively in the one or more blockchains in association with the one or more local accounts comprises: correspondingly in the plurality of blockchains, creating in a batch the plurality of blockchain addresses in association with the one local account.

3. The method of claim 1, wherein:
   obtaining the one or more local accounts, the one or more identifications of the one or more blockchains, and the one or more requests comprises: obtaining the one or more requests for creating the plurality of blockchain addresses in one blockchain in association with a plurality of local accounts; and
   creating the plurality of blockchain addresses respectively in the one or more blockchains in association with the one or more local accounts comprises: in the one blockchain, creating in a batch the plurality of blockchain addresses in association with the plurality of the local accounts.

4. The method of claim 1, wherein:
   obtaining the one or more local accounts, the one or more identifications of the one or more blockchains, and the one or more requests comprises: obtaining the one or more requests for creating the plurality of blockchain addresses in a plurality of blockchains in association with a plurality of local accounts; and creating the plurality of blockchain addresses respectively in the one or more blockchains in association with the one or more local accounts comprises: correspondingly in the plurality of blockchains, creating in a batch the plurality of blockchain addresses in association with the plurality of the local accounts.

5. The method of claim 1, further comprising:
storing a plurality of mapping relationships among the one or more local accounts, the plurality of created blockchain addresses, the plurality of public-private key pairs, and the one or more identifications of the one or more blockchains.

6. The method of claim 1, wherein creating the plurality of blockchain addresses respectively in the one or more blockchains, in association with the one or more local accounts and the plurality of public keys of the plurality of public-private key pairs comprises:
constructing a blockchain transaction comprising the plurality of public keys; and
sending the blockchain transaction to one or more blockchain nodes of the one or more blockchains according to the one or more identifications to create the plurality of blockchain addresses respectively based on the plurality of public keys.

7. The method of claim 1, wherein generating the plurality of public-private key pairs respectively for the plurality of blockchain addresses to be created comprises:
for each of the plurality of blockchain addresses, generating a public-private key pair and encrypting a private key of the public-private key pair.

8. The method of claim 7, wherein generating the public-private key pair and encrypting the private key of the public-private key pair comprises:
in a Trusted Execution Environment (TEE), generating the public-private key pair and encrypting the private key of the public-private key pair.

9. The method of claim 7, wherein creating the plurality of blockchain addresses respectively in the one or more blockchains, in association with the one or more local accounts and the plurality of public keys of the plurality of public-private key pairs further comprises:
for each of the plurality of blockchain addresses, storing the encrypted private key in a Key Management System (KMS).

10. The method of claim 7, further comprising:
for each of the plurality of blockchain addresses, storing a mapping relationship among one of the local accounts, the each of the blockchain addresses, a corresponding Key Management System (KMS) directory, and one of the identifications, wherein the KMS directory links to the corresponding encrypted private key.

11. The method of claim 1, wherein obtaining the one or more local accounts, the one or more identifications of the one or more blockchains, and the one or more requests comprises:
obtaining, from the client, the one or more local accounts in accordance with a Lightweight Directory Access Protocol (LDAP).

12. A system for blockchain address mapping, comprising one or more processors and one or more non-transitory computer-readable memories coupled to the one or more processors and configured with instructions executable by the one or more processors to cause the system to perform operations comprising:
obtaining, from a client, one or more local accounts, one or more identifications of one or more blockchains, and one or more requests for creating in the one or more blockchains a plurality of blockchain addresses in association with the one or more local accounts, wherein the client corresponds to the one or more local accounts in the system;
generating a plurality of public-private key pairs respectively for the plurality of blockchain addresses to be created;
creating the plurality of blockchain addresses respectively in the one or more blockchains, in association with the one or more local accounts and a plurality of public keys of the plurality of public-private key pairs; and
transmitting a notification to the client for the client to correspondingly store the one or more local accounts in association with the one or more identifications of the one or more blockchains, wherein:
the notification comprises the one or more local accounts for which the plurality of blockchain addresses are created and the one or more corresponding identifications of the one or more blockchains, and
the plurality of blockchain addresses and a plurality of private keys of the plurality of public-private key pairs are stored in the system and are not stored at the client.

13. The system of claim 12, wherein:
obtaining the one or more local accounts, the one or more identifications of the one or more blockchains, and the one or more requests comprises: obtaining the one or more requests for creating the plurality of blockchain addresses in a plurality of blockchains in association with a plurality of local accounts; and
creating the plurality of blockchain addresses respectively in the one or more blockchains in association with the one or more local accounts comprises: correspondingly in the plurality of blockchains, creating in a batch the plurality of blockchain addresses in association with the plurality of the local accounts.

14. The system of claim 12, wherein the operations further comprise:
storing a plurality of mapping relationships among the one or more local accounts, the plurality of created blockchain addresses, the plurality of public-private key pairs, and the one or more identifications of the one or more blockchains.

15. A non-transitory computer-readable storage medium for blockchain address mapping, the storage medium associated with a system for blockchain address mapping, the storage medium configured with instructions executable by one or more processors to cause the one or more processors to perform operations comprising:
obtaining, from a client, one or more local accounts, one or more identifications of one or more blockchains, and one or more requests for creating in the one or more blockchains a plurality of blockchain addresses in association with the one or more local accounts, wherein the client corresponds to the one or more local accounts in the system;
generating a plurality of public-private key pairs respectively for the plurality of blockchain addresses to be created;
creating the plurality of blockchain addresses respectively in the one or more blockchains, in association with the one or more local accounts and a plurality of public keys of the plurality of public-private key pairs; and
transmitting a notification to the client for the client to correspondingly store the one or more local accounts in association with the one or more identifications of the one or more blockchains, wherein:
- the notification comprises the one or more local accounts for which the plurality of blockchain addresses are created and the one or more corresponding identifications of the one or more blockchains, and
- the plurality of blockchain addresses and a plurality of private keys of the plurality of public-private key pairs are stored in the system and are not stored at the client.

16. The storage medium of claim 15, wherein:

obtaining the one or more local accounts, the one or more identifications of the one or more blockchains, and the one or more requests comprises: obtaining the one or more requests for creating the plurality of blockchain addresses in a plurality of blockchains in association with one local account; and creating the plurality of blockchain addresses respectively in the one or more blockchains in association with the one or more local accounts comprises: correspondingly in the plurality of blockchains, creating in a batch the plurality of blockchain addresses in association with the one local account.

17. The storage medium of claim 15, wherein the operations further comprise:

storing a plurality of mapping relationships among the one or more local accounts, the plurality of created blockchain addresses, the plurality of public-private key pairs, and the one or more identifications of the one or more blockchains.

18. The storage medium of claim 15, wherein:

obtaining the one or more local accounts, the one or more identifications of the one or more blockchains, and the one or more requests comprises: obtaining the one or more requests for creating the plurality of blockchain addresses in one blockchain in association with a plurality of local accounts; and creating the plurality of blockchain addresses respectively in the one or more blockchains in association with the one or more local accounts comprises: in the one blockchain, creating in a batch the plurality of blockchain addresses in association with the plurality of the local accounts.

* * * * *